United States Patent [19]

Thuy

[11] 4,395,666
[45] Jul. 26, 1983

[54] D.C. SERIES EXCITED TRACTION MOTOR CAPABLE OF OPERATING WITH A CONTINUOUS CURRENT POWER SUPPLY

[75] Inventor: N'Guyen U. Thuy, La Verpilliere, France

[73] Assignee: Societe CEM Compagnie Electro-Mecanique & Cie SNC, Paris, France

[21] Appl. No.: 247,341

[22] Filed: Mar. 25, 1981

[30] Foreign Application Priority Data

Mar. 26, 1980 [FR] France ................................ 80 06682

[51] Int. Cl.$^3$ ............................................. H02P 5/06
[52] U.S. Cl. ..................................... 318/139; 318/358
[58] Field of Search ........ 318/358, 359, 351, 348–349, 318/508, 509, 511, 492, 514, 515, 516, 527, 528, 534, 139

[56] References Cited

U.S. PATENT DOCUMENTS 3,614,567  8/1982  Payne et al. ..................... 318/139

Primary Examiner—J. V. Truhe
Assistant Examiner—A. Evans
Attorney, Agent, or Firm—Burns, Doane, Swecker & Mathis

[57] ABSTRACT

This invention pertains to a direct current, series excited traction motor, the armature coil of which is connected in series with the field coil and a smoothing coil, and the power supply of which is adjusted by a current chopper. The inductor includes, in addition, a shunting device for reduction of excitation, and a free wheeling diode is in parallel with the motor and the smoothing coil. This device is unique in that the field coil is divided into at least two series connected partial coils to generate additive flux, one of them only being provided with the shunting device. The chopper is advantageously of a type which may operate in a continuous conduction mode.

8 Claims, 3 Drawing Figures

D.C. SERIES EXCITED TRACTION MOTOR CAPABLE OF OPERATING WITH A CONTINUOUS CURRENT POWER SUPPLY

BACKGROUND OF THE INVENTION

The invention pertains to a traction device provided with a direct current, series excited motor, the power supply of which is controlled by a direct current static converter of the chopper type. Devices of this kind may be used in vehicles with batteries (wagons, automobiles, etc.) for example, and more specifically for traction of electric locomotives.

The choice of the motor of the series type, in the field of traction, has been desirable for a long time because of its numerous advantages compared to other known types. In addition, the control equipment for such motors, which was electro-mechanical, has developed into static type equipment using direct current converters of the chopper type. Indeed, these converters enable a variable voltage to be supplied in a continuous manner, offering numerous advantages compared to a device of the rheostat type, for example. A chopper may be compared to a static contact breaker with periodic on and off modes for transmitting an average variable voltage. In addition, a slightly oscillating current is generally desirable.

This is why a circuit called a free circulation circuit, or free wheeling circuit, for maintaining the current in the motor when it is interrupted by the chopper, has been utilized. The self-inductance of the motor circuit accumulates energy when the chopper is conducting and releases this energy through the free wheeling circuit when the chopper is non-conducting. Such a free wheeling circuit is easily obtained by means of a diode in parallel with the motor. In addition, a smoothing self inductance is generally included in the circuit in order to reduce the oscillation of the current.

If T represents the length of one period of the chopper, and tf the duration of conduction of the chopper during a period, it is plain that the ratio of conduction tf/T of this chopper is adjustable by varying either tf (fixed frequency variation) or T (variable frequency variation).

Thus, traction devices with a direct current series type motor that is fed by a static chopper generally include a free wheeling diode and a smoothing self-inductance. However, it is known that for this kind of device, in which the inductor includes a thyristor shunting device whose control is linked to the chopper's, or in which the series inductor is connected in the circuit of the free wheeling diode (automatic shunting of inductor), it is not possible to operate the chopper under continuous conduction without taking the chance of entirely cancelling the flux of the motor and thereby creating a dangerous mode of operation.

Such devices have, in particular, the double disadvantage of creating permanent losses because of the chopper operation, on the one hand, and, on the other hand, to cause an unwanted drop in the voltage between the power supply system and the motor, which reduces the performance of the device and its yield after the starting phase.

There are also devices in which the chopper may be forced or enabled to operate under continuous conduction after the starting phase, the motor including then two series type field coils. One of the coils is in the circuit of the free wheeling diode and the other is in the armature circuit of the motor. However, devices of this type have the disadvantage of requiring an uncontrollable variable starting effort.

It is therefore, a general object of the present invention to provide a device that overcomes the above mentioned disadvantages. In addition, the device, according to this invention, increases the stability of the traction system, to reduce the oscillation of the field flux of the traction engine and to improve the yield.

In order to achieve these goals, this invention proposes a device for electric traction equipped with at least one d.c. motor, the field coil of which is in series with the armature coil and the smoothing coil, and the power supply of which is adjusted by means of a converter of direct current of the chopper type. The inductor also includes a shunting device for reduction of excitation and a free wheeling diode is in parallel with the motor and the smoothing coil. The field coil is divided into at least two partial coils which are in series, in order to generate additive flux, one of them only being provided with the shunting device.

The chopper is preferably of a type which may be operated under continuous conduction. In this case, when the chopper is forced into continuous conduction, it is, of course, possible to regain control of the total field flux by controlling the operation of the chopper.

However, one particular embodiment of the invention is advantageous in that it includes a means for adjusting the total field flux in addition to adjusting the chopper in order to provide an adjustment of the excitation rate when the chopper is forced into continuous conduction. In this case, the means for adjusting is advantageously made up of the shunting device of the corresponding partial field coil, this device being then adjustable independently of the chopper. For this purpose, the shunting device may include an auxiliary chopper, for example, or a plurality of resistances set in parallel, each one being provided with an individual circuit breaker.

BRIEF DESCRIPTION OF THE DRAWINGS

This invention will be better understood by reading the following description with reference to the attached drawing, in which.

DETAILED DESCRIPTION

Figure 1:
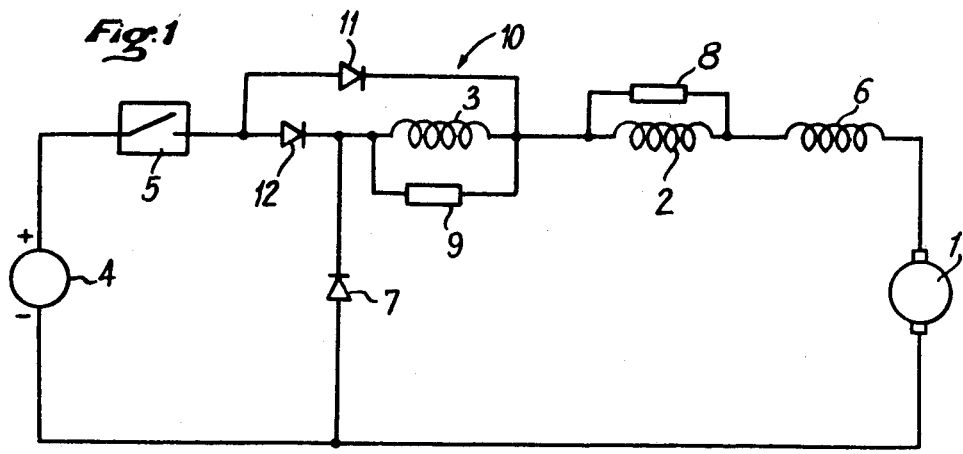
FIGS. 1 to 3 illustrate, schematically and respectively, three modes of realization according to the invention, and in which elements of the same nature bear the same reference numeral.
Figure 2:
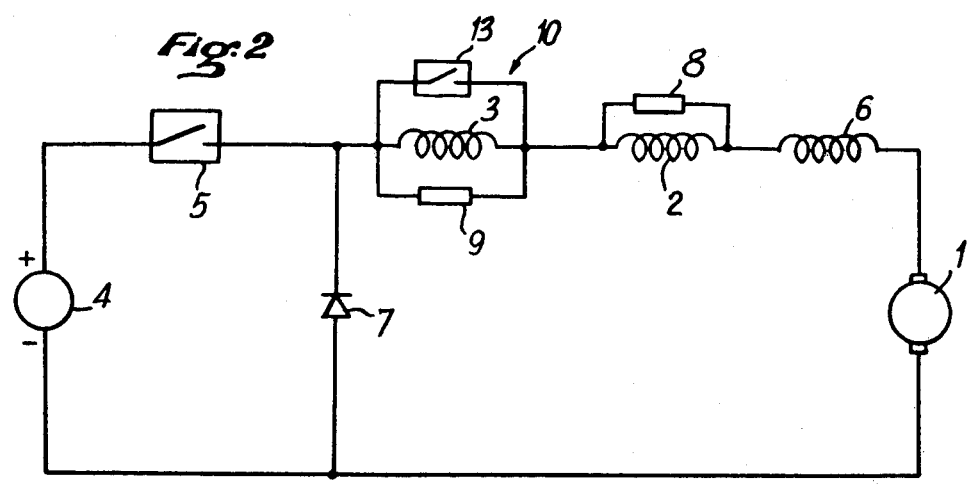
Figure 3:
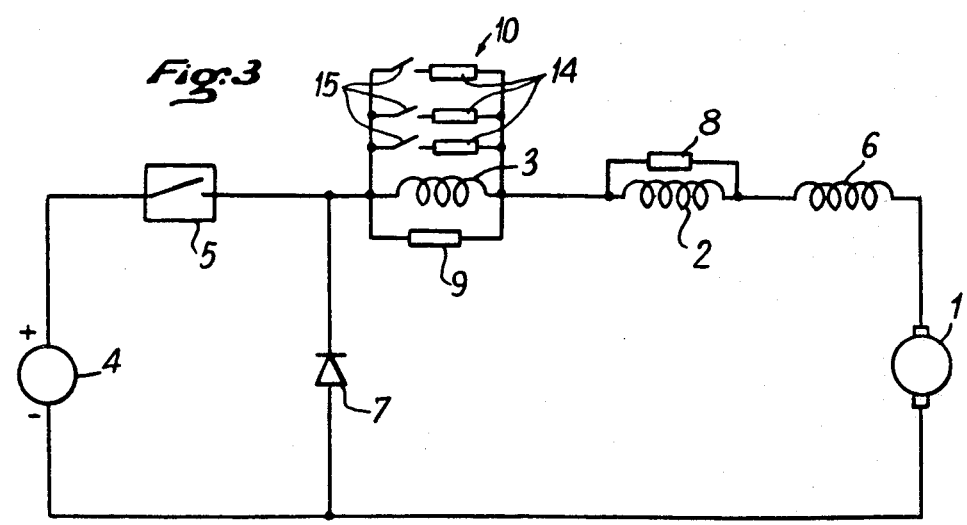

The devices illustrated on FIGS. 1 to 3 include a direct current, series excited traction motor which is provided with an armature coil 1 and two field coils 2 and 3, respectively. The motor is fed by a source 4 which is controlled by a chopper 5. This source 4 is made up, for example, of supply catenary of a locomotive equipped with the device according to the invention.

The inductors 2 and 3 are in series with the armature coil 1 and the source 4. In addition, a smoothing coil 6 is also in series in the circuit of the armature coil 1.

A diode 7, of free circulation or free wheeling, is in parallel with all of the above mentioned series elements 1, 2, 3 and 6, its anode being connected to the negative side of the source 4.

As has already been stated, the smoothing coil 6 reduces the oscillations of the current and the free wheeling diode permits the release of the magnetic energy stored in the various coils during the non-conducting period of the chopper 5.

The inductors 2 and 3 are advantageously provided with the shunting resistances 8 and 9, to divert the negative components of the oscillating current so that the current flowing in the inductors will be practically continuous. In addition, the inductor 3 is provided with the shunting device 10. In FIG. 1, the shunting device of the inductor is of a well-known type including a thyristor 11 and a semi-conductor 12.

The device shown in FIG. 1 operates in the following manner: During the starting phase, the conduction ratio of the chopper 5 varies between a minimum and a maximum while the shunting device 10 of the inductor 3 is not conducting. Under these conditions, the current in inductors 2 and 3 and in the armature coil 1 are appreciably equal in average value, if we ignore the effects of the current path diversions constituted by the resistances 8 and 9.

When the above mentioned conduction ratio reaches its maximum value, the thyristor 11 of the shunting device 10 conducts and causes a progressive reduction toward zero of the field flux generated by the inductor 3, while maintaining constant currents in the armature coil 1 and the inductor 2.

When the field flux of the inductor 3 becomes appreciably nil, the chopper 5 may then be forced to operate in a continuous conduction mode. In this case, the non-conducting period of the chopper operates to turn off the thyristor 11, which does not turn off any more and the field flux coming from the inductor 3 completely disappears. Then, the inductor 2 remains alone in circuit to provide the field flux needed for the operation of the traction motor according to its own characteristics.

In the device described above, it is plain that if the renewed control of the total field flux is desired, it will be necessary to control again the operation of the chopper 5 and to bring its conduction ratio back to a value below 1. Controlling of the field flux, independently from the chopper 5, can be achieved with the embodiments of the invention shown in FIGS. 2 and 3, which are provided with an adjustable shunting device 10. The embodiments of FIGS. 2 and 3 include the same elements 1 to 9 as those described in FIG. 1. The differences appear at the shunting device 10.

FIG. 2 illustrates a shunting device 10 for an inductor which includes an auxiliary chopper 13. In this embodiment, when the main chopper 5 is forced to operate in a continuous conduction mode, there is no need to control it again to adjust the total field flux. Indeed, the control of the total field flux is possible at any time by means of the auxiliary chopper 13 and independently of the operation of the chopper 5.

FIG. 3 illustrates another embodiment in which the shunting devices includes several parallel resistances 14, each being provided with an interruptor or switch 15. Thus, the shunting device 10 is independent of the operation of the chopper 5, and it is possible to control the total field flux without having to control the operation of the chopper 5.

Of course, modifications or variants may be thought of without leaving the scope of this invention as well as in the choice of the elements or their connections. It is the case, in particular, the shunting device 10 represented in the embodiments of FIGS. 1 to 3 are given as non-limiting examples.

What is claimed is:

1. A direct current, series excited traction motor circuit, comprising:
    an armature coil;
    first and second field coils connected in series with said armature coil and with each other to generate additive magnetic flux;
    a smoothing coil connected in series with said armature and field coils;
    a diode connected in parallel with the series connection of said armature, field and smoothing coils;
    a current shunting device connected in parallel with said first field coil for controlling a shunt current to progressively reduce the field flux generated by said first field coil; and
    a current chopper for controlling the supply of direct current to said coils.

2. The motor circuit of claim 1 wherein said current chopper is capable of operating in a continuous conduction mode.

3. The motor circuit of claim 2 wherein said current shunting device includes means for regulating the total field flux.

4. The motor circuit of claim 6 wherein said regulating means is a thyristor connected in series with said current chopper.

5. The motor circuit of claim 3 wherein said regulating means operates independently of said current chopper.

6. A direct current, series excited traction motor circuit, comprising:
    an armature coil;
    first and second field coils connected in series with said armature coil and with each other to generate additive magnetic flux;
    a smoothing coil connected in series with said armature and field coils;
    a diode connected in parallel with the series connection of said armature, field and smoothing coils;
    a current chopper for controlling the supply of direct current to said coils; and
    a current shunting device connected in parallel with said first field coil to regulate the total field flux, said shunting device operating to conduct current with the same operating frequency as said current chopper and to block shunt current when said current chopper is not conducting.

7. A direct current, series excited traction motor circuit, comprising:
    an armature coil;
    first and second field coils connected in series with said armature coil and with each other to generate additive magnetic flux;
    a smoothing coil connected in series with said armature and field coils;
    a diode connected in parallel with the series connection of said armature, field and smoothing coils;
    a current chopper connected in parallel with said first field coil; and
    a current chopper for controlling the supply of direct current to said coils.

8. A direct current, series excited traction motor circuit, comprising:
    an armature coil;
    first and second field coils connected in series with said armature coil and with each other to generate additive magnetic flux;
    a smoothing coil connected in series with said armature and field coils;
    a diode connected in parallel with the series connection of said armature, field and smoothing coils;
    a plurality of resistances connected in parallel with said first field coil and one another, each resistance being provided with a series connected switch; and
    a current chopper for controlling the supply of direct current to said coils.

* * * * *